United States Patent
Cavazos-Gutierrez

(10) Patent No.: US 6,797,746 B2
(45) Date of Patent: Sep. 28, 2004

(54) ULTRAVIOLET RADIATION CURABLE INK COMPOSITION AND A PROCESS FOR ITS APPLICATION ON GLASS SUBSTRATES

(75) Inventor: Rodrigo Cavazos-Gutierrez, Nuevo León (MX)

(73) Assignee: Vidriera Monterrey, S.A. de C.V., Nuevo Leon (MX)

(*) Notice: Subject to any disclaimer, the term of this patent is extended or adjusted under 35 U.S.C. 154(b) by 53 days.

(21) Appl. No.: 09/925,559

(22) Filed: Aug. 9, 2001

(65) Prior Publication Data

US 2002/0061939 A1 May 23, 2002

Related U.S. Application Data

(63) Continuation-in-part of application No. 09/218,878, filed on Dec. 22, 1998, now abandoned.

(51) Int. Cl.$^7$ .................. C09D 11/10; C08L 63/00; C08L 75/04; C08K 5/29; C08F 2/48
(52) U.S. Cl. .................. 523/160; 523/465; 524/196; 524/590; 522/92; 522/100
(58) Field of Search .................. 523/160, 161, 523/415, 465; 524/196, 197, 589, 590; 522/92, 97, 100

(56) References Cited

U.S. PATENT DOCUMENTS 5,100,934 A * 3/1992 Glesias .................. 523/456
5,363,994 A * 11/1994 Angeline .................. 222/529
5,554,217 A *  9/1996 Babler .................. 106/494
5,696,177 A * 12/1997 Noguchi et al. .............. 522/31
5,821,031 A * 10/1998 Hashimoto et al. ...... 430/280.1

FOREIGN PATENT DOCUMENTS

JP       07070501 A   *   3/1995

OTHER PUBLICATIONS

Machine Translation of JP 07070501 A (1995).*
English Translation of JP 07070501 A (1995).*

* cited by examiner

*Primary Examiner*—Callie Shosho
(74) *Attorney, Agent, or Firm*—Abelman, Frayne & Schwab

(57) ABSTRACT

An ultraviolet radiation curable organic ink composition, comprising 80% to 95% by weight of an epoxy-polyurethane-based ink; 0.5% to 8% by weight of an additive including a mixture of polyethylenic waxes and polythetrafluoroethylenic waxes; 1% to 8% by weight of a blocked aliphatic polyisocyanate catalyst; and an adhesion promoter primer including 0.15% to 3% by weight of a silane, which can be directly included in the ultraviolet radiation curable organic ink composition or independently applied to a substrate, in order that the blocked aliphatic polyisocyanate catalyst promote a polymerization reaction and a crosslinking reaction between the epoxy-polyurethane-based ink and the adhesion promoter, when heated to 160 to 200° C., forming an interpenetration network.

9 Claims, 1 Drawing Sheet

ULTRAVIOLET RADIATION CURABLE INK COMPOSITION AND A PROCESS FOR ITS APPLICATION ON GLASS SUBSTRATES

This application is a Continuation in Part of Ser. No. 09/218,878 filed on Dec. 22, 1998, now abandoned.

BACKGROUND OF THE INVENTION

A. Field of the Invention

The present invention relates to an organic ink composition for a glass substrates and a process for its application and, more specifically to an organic ink composition of the type which is curable by ultra-violet radiation, for printing labels, designs or any other decoration on glass bottles,

B. Description of the Related Art

There are some known inorganic and organic pigment compositions in the market, which provide an acceptable coloration mainly for the printing and decoration of plastic and paper articles. However, those pigment compositions have not been considered suitable for application on glass substrates mainly because of its weak resistance to water, solvents, abrasion, etc.

There is a number of well known radiation curable ink compositions for screen printing, including metallic pigments such as copper, silver, cadmium, chromium, manganese, etc. Examples of such ink compositions are disclosed in U.S. Pat. Nos. 3,957,694; 3,968,056 and 3,989,644 all of Bolon et al, mainly suitable for screen-printing on printed circuits.

It has been an increased interest of glassmakers, specifically of glass bottle makers, to use organic inks for labeling or decorating glass bottles, mainly for environmental preservation purposes and reduce the energy needs, as well as for complying with ambient regulations.

It is also known a number of organic compositions, pigmented or not, which are applied and cured by ultra-violet to infra-red radiation, for the most diverse purposes such as providing privacy, solar radiation control, abrasion strengthening, etc., examples of these organic compositions are disclosed in the U.S. Pat. Nos. 4,923,754 and 4,946,874 both of Lee et all; U.S. Pat. No. 5,514,521 of Kobayashi; U.S. Pat. No. 5,178,952 of Yamamoto et al; and U.S. Pat. No. 5,262,450 of Vera et al.

The application of these pigments or coatings is commonly limited to plastic and paper substrates, printed circuits, etc., but no information has been available to applicant regarding glass applications, mainly because of a poor adhesion or anchoring to the very smooth surface of the glass substrates, as well as because of their poor resistance to the water, solvents and abrasion for rough handling U.S. Pat. No. 5,731,359 of Kamen et al, disclose a pigmented ink composition including a radiation curable component and a pyrrolopyrrol or isoindoline pigment, to provide a red or yellow color, which apparently can be applied by hot stamping from a foil or directly to a substrate and then cured by radiation.

Finally, U.S. Pat. No. 5,696,177 of Noguchi et al discloses a composition intended, among other, for glass surfaces comprising (i) a linear copolymer containing a first component of a monomer selected from alkyl methacrylate, acrylonittrile and styrene, and a second component of a hydrophilic monomer, and (ii) a resin obtained by esterifying a part of epoxy groups present in an epoxy resin which can be selected, among others, from epoxy-uretane resins. The linear polymer (i) is present in an amount of 20 to 80 parts by weight, and said resin (ii) is contained in an amount of 80 to 20 parts by weight. This composition may contain a silane adhesion promoter; a polyamide, and additives, without specifying the amounts thereof.

Those inks apparently have been suitable for application on disposable (no-returnable) glass bottles.

Therefore, some adhesion promoters, photo-initiator such as the Irgacure 184 from Ciba Geigy, strengthening agents, storage stabilizers, photosensitizes, crosslinking agents and so forth, have been introduced into the ink compositions and coatings in order to improve their resistance to the bottle filling process, the multiple alkaline washing process and rough handling, but sill they have not been considered suitable for imparting the desired properties for application to returnable glass bottles.

In accordance with the present invention, it is provided an ultraviolet radiation curable organic ink composition, comprising 80% to 95% by weight of an epoxy-polyurethane-based ink; 0.5% to 8% by weight of an additive including a mixture of polyethylenic waxes and polythetrafluorethylenic waxes; an adhesion promoter which can be added to the ink formula or independently applied as a primer on the glass substrate before the decoration process, and which includes a silane in a concentration of 0.15% to 3% by weight; and 1% to 8% by weight of a blocked aliphatic polyisocyanate catalyst that promotes a polymerization reaction and additionally a crosslinking reaction between the epoxy-polyurethane-based ink and the adhesion promoter, when heated to at about 160 to 200° C., forming an interpenetration network (known as IPN) formed by the ink composition on the glass substrate, that is specifically suitable for glass substrates;

has an increased adherence to a glass substrate because of a strong interpenetration network formed by the ink composition on the glass substrate, after heating the glass substrate to about 160 to 200° C., caused by a crosslinking reaction between the epoxy-polyurethane-based ink and the primer, suitable promoted by a blocked aliphatic polyisocyanate catalyst;

surprisingly has a desired strengthening to the washing, before and after the filling process, as well as a suitable resistance to chemicals and resistance to the abrasion and heavy duty to which non-returnable glass bottles are subjected;

can be calcined at the furnace when it is recycled as cullet into a molten glass mass, without affecting the properties of the glass mass because it does not contain toxic metals such as lead, cadmium, hexavalent chromium, etc.;

is environmentally suitable because it does not generate noxious combustion gases nor hot-house gases;

reduces the ink consumption because it has a specific gravity which is about four times less heavier than the vitrifiable ceramic paints which have commonly been used for the decoration of glass bottles;

provides a greater yield per weight unit and saves energy and space because it does not need big furnaces for heating the paint;

provides more intense and bright colors and a more wide range of colors than the ceramic paints;

has a better adherence to the glass substrate because of the crosslinking reaction between the epoxy-polyurethane-based ink and the adhesion promoter, after it is heated, forming the interpenetration network on the surface of the glass bottles and because of the specific application method by which it is applicable.

Furthermore, in accordance with the present invention, it is provided a process for the preparation and application of the above disclosed ultraviolet radiation curable organic ink composition, comprising: a) preparing an ultra-violet radiation curable ink composition by mixing 80% to 95% by weight of an epoxy-polyurethane-base ink composition; and 0.5% to 8% by weight of an additive prepared from a mixture of polyethylenic waxes and polythetrafluorethylenic waxes, strongly stirring the mixture; b) adding an adhesion promoter primer composition comprising 0.15% to 3% by weight of a silane; c) adding from 1 to 8% by weight of a blocked aliphatic polyisocyanate catalyst; e) applying the prepared ink composition on the glass substrate, by serigraphy, tampography or the like and curing the ink composition by exposing the coated surface to an ultraviolet radiation; f) heating the substrate by passing it through a heating lehr to increase the temperature of the substrate between 160° C. to 200° C. to promote a crosslinking reaction between the epoxy-polyurethane-based ink and the adhesion promoter primer, forming an interpenetration network; and g) applying a lubricant agent including an oleic acid-based product as a gas or vapor, and/or spraying an aqueous emulsion of an ethoxylated polyethylen-derivative.

It has also been found that the adhesion promoter can be preliminary applied as a primer on the glass substrate before the decoration process, instead of combining it at the composition, although this adds an additional step to the application (decoration) process.

Furthermore, for the application of the primer to a glass surface, the primer may me conveniently hydrolyzed by the addition of water, and then preparing a solution with the hydrolyzed primer in a mixture of water and ethyl alcohol acidified with acetic acid or carbon dioxide, to be applied to the glass surface by spraying, or dipping or wiping the bottles in said solution, and then drying by heating at 100° C. to 150° C. for 5 to 25 minutes.

So that the above composition in combination with the disclosed process for its preparation and application, provides all the above-disclosed advantages over the known prior art.

SUMMARY OF THE INVENTION

It is therefore a main object of the present invention, to provide an ultraviolet radiation curable organic ink composition specially suitable for glass substrates and glass bottles, which has a desired strength to the washing with water and chemicals, before and after the bottle-filling process, as well as a suitable resistance to the severe abrasion and heavy duty to which non-returnable glass bottles are subjected;

It is also a main object of the present invention, to provide an ultraviolet radiation curable organic ink composition, of the above disclosed nature, which has an increased adherence to a glass substrate because of a strong interpenetration network formed by the ink composition on the glass substrate, after heating the glass substrate to about 160 to 200° C., caused by a crosslinking reaction between the epoxy-polyurethane-based ink and the primer, promoted by a blocked aliphatic polyisocyanate catalyst;

It is also a main object of the present invention, to provide an ultraviolet radiation curable organic ink composition, of the above disclosed nature, which may be calcined at a furnace when it is recycled as cullet into a molten glass mass, without affecting the properties of the glass mass because it does not contain toxic metals such as lead, cadmium, hexavalent chromium, etc. and which makes it is environmentally suitable because it does not generate noxious combustion gases nor hot-house gases;

It is also a main object of the present invention, to provide an ultraviolet radiation curable organic ink composition, of the above disclosed nature, which reduces the ink consumption because it has a specific gravity which is about four times less heavier than the vitrifiable ceramic paints which have commonly been used for the decoration of glass bottles, providing a greater yield per weight unit and saves energy and space because it does not need big furnaces for heating the paint;

It is still a main object of the present invention, to provide an ultraviolet radiation curable organic ink composition, of the above disclosed nature, which provides more intense and bright colors and a more wide range of colors than the ceramic paints.

It is additionally a main objective of the present invention, to provide a process for the preparation and application of an ultraviolet radiation curable organic ink composition specially suitable for glass substrates, by which all of the above desired disclosed properties are imparted to the glass substrates, products or bottles.

These and other additional objects and advantages of the present invention will be evident to those persons having ordinary skill in the art, from the following detailed description of the invention with reference to specific embodiments thereof.

DETAILED DESCRIPTION OF THE INVENTION

Figure 1:
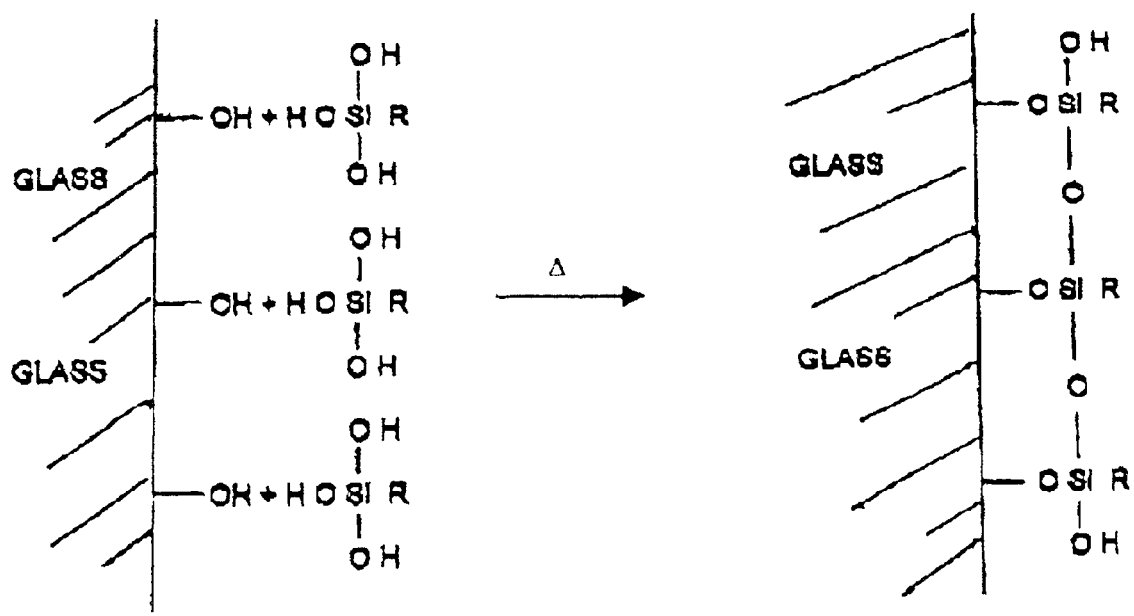
FIG. 1, is an schematic mechanism of the condensation process of a silane solution on the glass surface of a glass bottle by the "Drying Process", as explained in the detailed description of the invention.

In accordance with the present invention, it is provided an ultraviolet radiation curable ink composition comprising:

an ultra-violet radiation curable ink composition including 80 to 95% by weight of an epoxy-polyurethane-based ink; and 0.5% to 8% by weight of an additive including a mixture of polyethylenic waxes and polythetrafluorethylenic waxes;

1 to 8% by weight of a blocked aliphatic polyisocyanate catalyst, and an adhesion promoter primer including 0.15% to 3% by weight of a silane which can be included directly in the ultra-violet radiation curable ink composition, or independently applied to a substrate before applying the ultra-violet radiation curable ink composition, in order that the blocked aliphatic polyisocyanate catalyst promote a polymerization reaction and a crosslinking reaction between the epoxy-polyurethane-based ink and the adhesion promoter, when heated at 160 to 200° C., forming an interpenetration network.

As to the process for the preparation and application of the above disclosed ultraviolet radiation curable organic ink composition, in a preferred embodiment thereof, this comprises:

a) preparing an ultra-violet radiation curable ink composition by:
   i) mixing 80% to 95% by weight of an epoxy-polyurethane ink; and 0.5% to 8% by weight of an additive prepared from a mixture of polyethylenic waxes and polythetrafluorethylenic waxes, strongly stirring the mixture; and
   ii) adding from 1 to 8% by weight of a blocked aliphatic polyisocyanate catalyst;

b) independently applying an adhesion promoter primer composition comprising 0.15% to 3% by weight of a silane, to a surface of the substrate;

c) applying the ultra-violet radiation curable ink composition on the glass substrate, by serigraphy or tampography;

d) curing the ink composition on the substrate by exposing the substrate to an ultra-violet radiation; and f) heating the substrate to increase its temperature between 165° to 200° C. in order that the blocked aliphatic polyisocyanate catalyst promote a polymerization reaction and a crosslinking reaction between the epoxy-polyurethane-based ink and the adhesion promoter, forming an interpenetration network; and g) applying a lubricant agent including an oleic acid-based product as a gas or vapor, and spraying an aqueous emulsion of an ethoxilated polyethylen-derivative, on the portion of the glass substrate including the ink composition.

In another embodiment of the invention, it is convenient to prepare separately the adhesion promoter primer composition by: firstly hydrolyzing the primer, such as the N-B-(N-vinyl-benzyl-amino)ethyl-γ-aminopropyltrimethoxysilane monohydrogen chloride, by adding 1% by weight of demineralized water, letting the mixture to rest for 24 hours in order that the hydrolyzing take place and reduce the energy needed to bond the topcoat, and then preparing a diluted solution with the hydrolyzed silane at a concentration of 0.5 to 5.0% by weight, in a mixture of water and ethyl alcohol acidified with acetic acid or carbon dioxide, to a pH of 5.0 to 6.0; and applying this solution to the glass surface by spraying, or dipping or wiping the bottles in said solution, and then drying the treated bottle by heating at 100° C. to 150° C., preferably to 110° C. for a time of 5 to 25 minutes, preferably for 15 minutes.

Furthermore, the adhesion promoter primer can be directly added to the ultraviolet radiation curable ink composition to be applied as a single ink composition to the substrate.

The chemistry mechanism of the alkoxy-silane is as follows

A) Hidrólisis: R Si(OCH$_3$)$_3$+3H$_2$O→R Si(OH)$_3$+3CH$_3$OH

B) The condensation of the glass surface by the drying process is as illustrated in FIG. 1.

Now, said epoxy-polyurethane-base ink, can be specifically selected from different colors, when red color is desired, this is selected from the family of monoazo pigments such as those known as cd-photoflex from the company Sericol, Inc., specifically that sold under the trademark Graftol 210; Red 2000 CD-JC-2455; Red Rubine CD-155; Intensive Red CD-141; Heat Red CD-180, all from the company Sericol, Inc.

The white color is selected from the family of the titainium dioxide, specifically those sold under the specifications Opaque White CD-311 also by Sericol Inc.

Other colors are Yellow Medium CD-123; Yellow Lemon CD-111; Silver Gray CD-302; Black Shadow CD-SB; Opaque Black CD-301; Reflex Blue CD-205; Blue Process CD-190; and others.

The additive including the mixture of polyethylenic waxes and polythetrafluoroethylenic waxes known as "PTFE" are selected from those sold as Polifluo XF-523 from the company Micropowders, Corp, the Series TL from Harwick Standard Chemical, Polipenco from Polymer Corporation and Whitcon from Whitford Chemical Corp., and others.

The adhesion promoter primer is selected from those sold as Z-6011, Z-6032, both from Dow Corning, A-1100 from Witco, or similar, or a mixture thereof.

The blocked aliphatic polyisocyanate catalyst is selected from that sold as SP-CD CATALYST FROM SERICOL, INC.

And finally, the lubricant agent including an oleic acid-based product is selected from that sold as AP-5 from US-CAN.

Thus, it is to be understood that, because of the properties of the ultraviolet curable organic ink composition, it is convenient to prepare and apply the composition a few hours before it is applied.

In the following examples, specific ultraviolet curable ink compositions of the present invention were applied on the surface of a glass piece, and the printed glass pieces were subjected to the following tests, to determine the specific characteristics of resistance of said ink compositions.

In all of the examples, the following connotation will be used referring to the corresponding meaning:

| | |
|---|---|
| INK = | Epoxypolyurethane based ink |
| WAX MIX = | Mixture of polyethylenic and polytetraflourethylemnic waxes. |
| CATALYST = | Bloqued aliphstic polyisocyanate catalyst. |
| PC TEMP = | Post-curing temperature. |

The test procedure called "HOT WATER 75° C., 15 MIN.", is a test carried out by submerging a glass piece printed with the UV radiation-curable ink and post-cured, into hot water at 75° C. during 15 minutes; then extracting the hot water and checking if there are any blisters or ink loosening.

The "COLD WATER 2° C., 15 MIN." is a test procedure carried out by submerging a glass piece printed with the UV radiation-curable ink and post-cured, into cold water at a temperature of 2° C. during 15 minutes; then extracting the cold water and checking if there are any blisters or ink loosening.

The "CROSS-HATCH TEST", is a test procedure which is carried out by making 6 parallel cuts or scratches spaced apart 1 mm between each other on a glass surface printed with the ink cured by means of UV radiation and post-cured, by means of a knife or a similar instrument, and then making another similar 6 cuts or scratches but this time perpendicularly at 90° to the first ones. Then cleaning said glass surface from any material loosen by the cuts or scratches, by means of a soft brush, and stick a transparent adhesive tape over the scratched area, pressing it to completely stick it to the ink on glass surface in said area; and finally roughly detach the adhesive tape from the glass surface and checking if the ink was removed by the adhesive tape.

"FILLING LINE SIMULATION TEST" were carried out by means of a filling line simulator: produced by the American Glass Research International, by Immersing glass bottles printed with the specific radiation cured inks of the present invention in hot water bath at 75° C., for 15 minutes, taking out the bottles from the hot water bath, emptying the hot water, letting stand them for 5 minutes at room temperature, filling them with cold water at a temperature of 0° C. to 2° C. and put the bottles on the filling line simulator equipment; rotating them at the simulator for one minute at a speed of 700 bottles per minute, stopping the simulator and finally checking the bottles for scratching and other ink damages.

EXAMPLE 1

Printing tests were carried out with the following UV radiation-curable ink compositions applied on the surface of glass bottles, which were treated with hydrolyzed trimethoxy silane at a concentration of 1.0% with water and ethyl alcohol and dried at a temperature of 100° C. to 150° C.

These tests were carried out maintaining constant the amounts of the blocked polyisocyanate catalyst and the post-curing temperature, changing the concentrations of the waxes.

| | WHITE COLOR INK COMPOSITION | | | | RESISTANCE TESTS ON GLASS BOTTLES | | | | |
|---|---|---|---|---|---|---|---|---|---|
| | | | | | HOT | COLD | | FILLING | |
| TEST No. | INK | WAX MIX | CATALYST | PC TEMP °C. | WATER 75° C., 15 MIN. | WATER 2° C., 5 MIN | CROSS-HATCH TEST | LINE SIMULATION TEST | OBSRV. |
| 1 | 98.5 | 0.5 | 1 | 165 | 20 | 40 | 50 | 20 | |
| 2 | 97.0 | 2.0 | 1 | 165 | 30 | 40 | 50 | 20 | |
| 3 | 95.0 | 4.0 | 1 | 165 | 40 | 55 | 70 | 20 | |
| 4 | 93.0 | 6.0 | 1 | 165 | 45 | 60 | 100 | 20 | |
| 5 | 91.0 | 8.0 | 1 | 165 | 45 | 60 | 80 | 20 | |

EXAMPLE 2

Same test as Example 1 were carried out, but maintaining the wax amount constant in 6.0 parts and the temperature at 165° C., and changing the concentration of the blocked polyisocyanate catalyst.

Printing tests of the glass bottles were carried out for said ink composition treated with hydrolyzed trimethoxy silane at a concentration of 1.0% with water and ethyl-alcohol and dried at a temperature of 100° C. to 150° C.

| | WHITE COLOR INK COMPOSITION | | | | RESISTANCE TESTS ON GLASS BOTTLES | | | | |
|---|---|---|---|---|---|---|---|---|---|
| | | | | | HOT | COLD | | FILLING | |
| TEST No. | INK | WAX MIX | CATALYST | PC TEMP °C. | WATER 75° C., 15 MIN. | WATER 2° C., 5 MIN | CROSS-HATCH TEST | LINE SIMULATION TEST | OBSRV. |
| 1 | 92.0 | 6.0 | 2.0 | 165 | 30 | 55 | 50 | 30 | |
| 2 | 90.0 | 6.0 | 4.0 | 165 | 55 | 75 | 80 | 40 | |
| 3 | 88.0 | 6.0 | 6.0 | 165 | 65 | 80 | 100 | 55 | |
| 4 | 88.0 | 6.0 | 8.0 | 165 | 70 | 90 | 100 | 60 | |
| 5 | 84.0 | 8.0 | 10.0 | 165 | 60 | 80 | 80 | 50 | |

EXAMPLE 3

Same test as Example 1 were carried out, but maintaining the wax amount constant in 6.0 parts and the concentration of the blocked polyisocyanate catalyst, and changing the post-curing temperature.

| | WHITE COLOR INK COMPOSITION | | | | RESISTANCE TESTS ON GLASS BOTTLES | | | | |
|---|---|---|---|---|---|---|---|---|---|
| | | | | | HOT | COLD | | FILLING | |
| TEST No. | INK | WAX MIX | CATALYST | PC TEMP °C. | WATER 75° C., 15 MIN. | WATER 2° C., 5 MIN | CROSS-HATCH TEST | LINE SIMULATION TEST | OBSRV. |
| 1 | 84.0 | 6.0 | 8.0 | 180 | 80 | 90 | 100 | 75 | |
| 2 | 84.0 | 6.0 | 8.0 | 190 | 90 | 100 | 100 | 90 | |
| 3 | 84.0 | 6.0 | 8.0 | 200 | 100 | 100 | 100 | 100 | |
| 4 | 84.0 | 6.0 | 8.0 | 210 | 100 | 100 | 100 | 100 | CHANGE INK COLOR TO BROWNISH |
| 5 | 84.0 | 8.0 | 8.0 | 220 | 100 | 100 | 85 | 100 | CHANGE INK COLOR TO DARKER BROWNISH |

It is to be finally understood that the invention is not limited to the above disclosed specific embodiments of the ink composition and of the process for preparing and applying it to the glass substrates, and that the persons having ordinary skill in the art will be able to introduce changes into the components and steps in view of the teachings of this invention, which will be within the scope of the invention as claimed in the following claims.

I claim:

1. An ultraviolet radiation curable organic ink composition for glass substrates, which comprises:
   (i) an ultraviolet radiation curable ink composition including (a) 80 to 95% by weight of an epoxy-polyurethane ink; and (b) 0.5% to 8% by weight of an additive including a mixture of polyethylenic waxes and polythetrafluorethylenic waxes;
   (ii) 1 to 8% by weight of a blocked aliphatic polyisocyanate catalyst; and,
   (iii) an adhesion promoter primer to be independently applied to the glass substrate before the ink composition, whereby the blocked aliphatic polyisocyanate catalyst promotes a polymerization reaction and a crosslinking reaction between the epoxy-polyurethane-based ink and the adhesion promoter, when heated at about 160 to 200° C., forming an interpenetration network.

2. The ultraviolet curable organic ink composition in accordance with claim 1, wherein the adhesion promoter primer is a trimethoxy-silane.

3. The ultraviolet curable organic ink composition in accordance with claim 1, wherein the adhesion promoter primer is N-B-(N-vinyl-benzyl-amin-o)-ethyl γ-aminopropyltrimethoxy-silane monohydrogen chloride.

4. The ultraviolet curable organic ink composition in accordance with claim 1, wherein the adhesion promoter primer is a diluted solution of a hydrolyzed silane at a concentration of 0.5 to 5.0% by weight, in a mixture of water and ethyl alcohol acidified with acetic acid or carbon dioxide, to a pH of 5.0 to 6.0.

5. A process for applying an ultraviolet curable ink composition to a substrate, comprising the following steps:
   a) preparing an ultra-violet radiation curable ink composition by:
      iii) mixing 80% to 95% by weight of an epoxy-polyurethane ink; and 0.5% to 8% by weight of an additive prepared from a mixture of polyethylenic waxes and polythetrafluorethylenic waxes, strongly stirring the mixture; and
      iv) adding from 1 to 8% by weight of a blocked aliphatic polyisocyanate catalyst;
   b) independently applying an adhesion promoter primer composition comprising 0.15% to 3% by weight of a silane, to a surface of the substrate;
   c) applying the ultra-violet radiation curable ink composition on the glass substrate, by serigraphy or tampography;
   d) curing the ink composition on the substrate by exposing the substrate to an ultra-violet radiation; and
   f) heating the substrate to increase its temperature between 165° to 200° C. in order that the blocked aliphatic polyisocyanate catalyst promote a crosslinking reaction between the epoxy-polyurethane-based ink and the adhesion promoter, forming an interpenetration network.

6. The process as claimed in claim 5, wherein the heating of the substrate is carried out by passing it through a heating lehr.

7. The process as claimed in claim 5, further comprising: applying an oleic acid lubricant agent as a gas or vapor, on the cured and heated and/or spraying an aqueous ethoxylated polyethylene emulsion, on the portion or the glass substrate including the ink composition.

8. The method of claim 5, comprising separately preparing the adhesion promoter primer by firstly hydrolyzing the primer by preparing a mixture of silane and 0.7 to 1% of demineralized water; letting the mixture to rest for 24 hours in order that the hydrolyzing take place; and then preparing a diluted solution with the hydrolyzed silane at a concentration of 0.5 to 5.0% by weight, in a mixture of water and ethyl alcohol acidified with acetic acid or carbon dioxide, to a pH of 5.0 to 6.0; and applying this solution on a surface of a glass substrate by spraying, dipping or wiping the substrate in said solution, and then drying the so treated substrate by heating at 100° C. to 150° C., for a time of 5 to 25 minutes.

9. The method of claim 8, wherein the step of drying the substrate treated with the hydrolyzed primer diluted solution is carried out by heating the glass substrate at 110° C. for 15 minutes.

* * * * *